May 28, 1957 W. W. CLARKE ET AL 2,793,818
APPARATUS FOR WINDING COILS
Filed Feb. 17, 1954 3 Sheets-Sheet 1
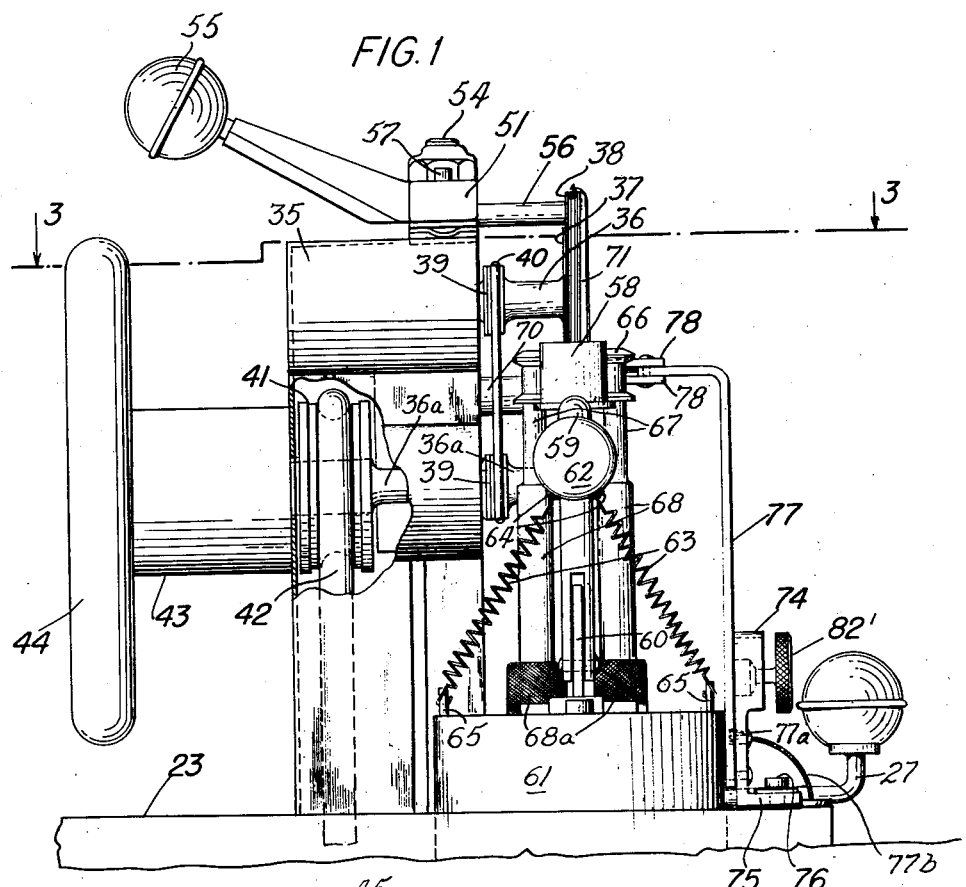
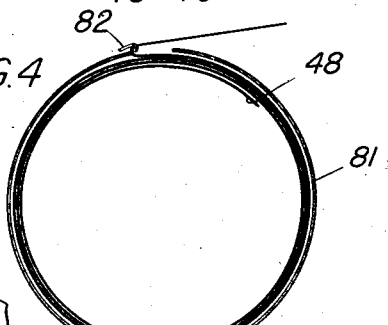
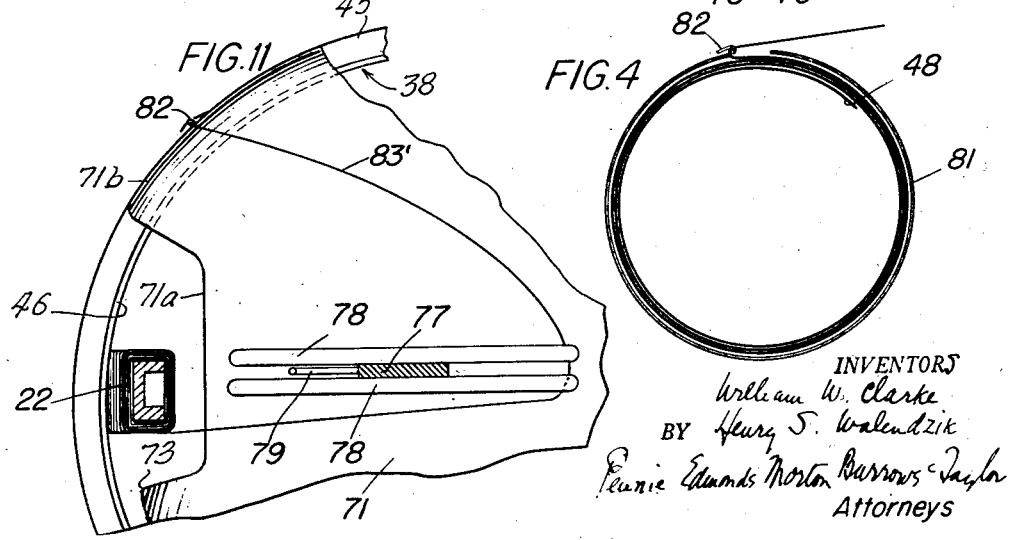
INVENTORS
William W. Clarke
Henry S. Walendzik
BY
Pennie Edmonds Morton Barrows Taylor
Attorneys

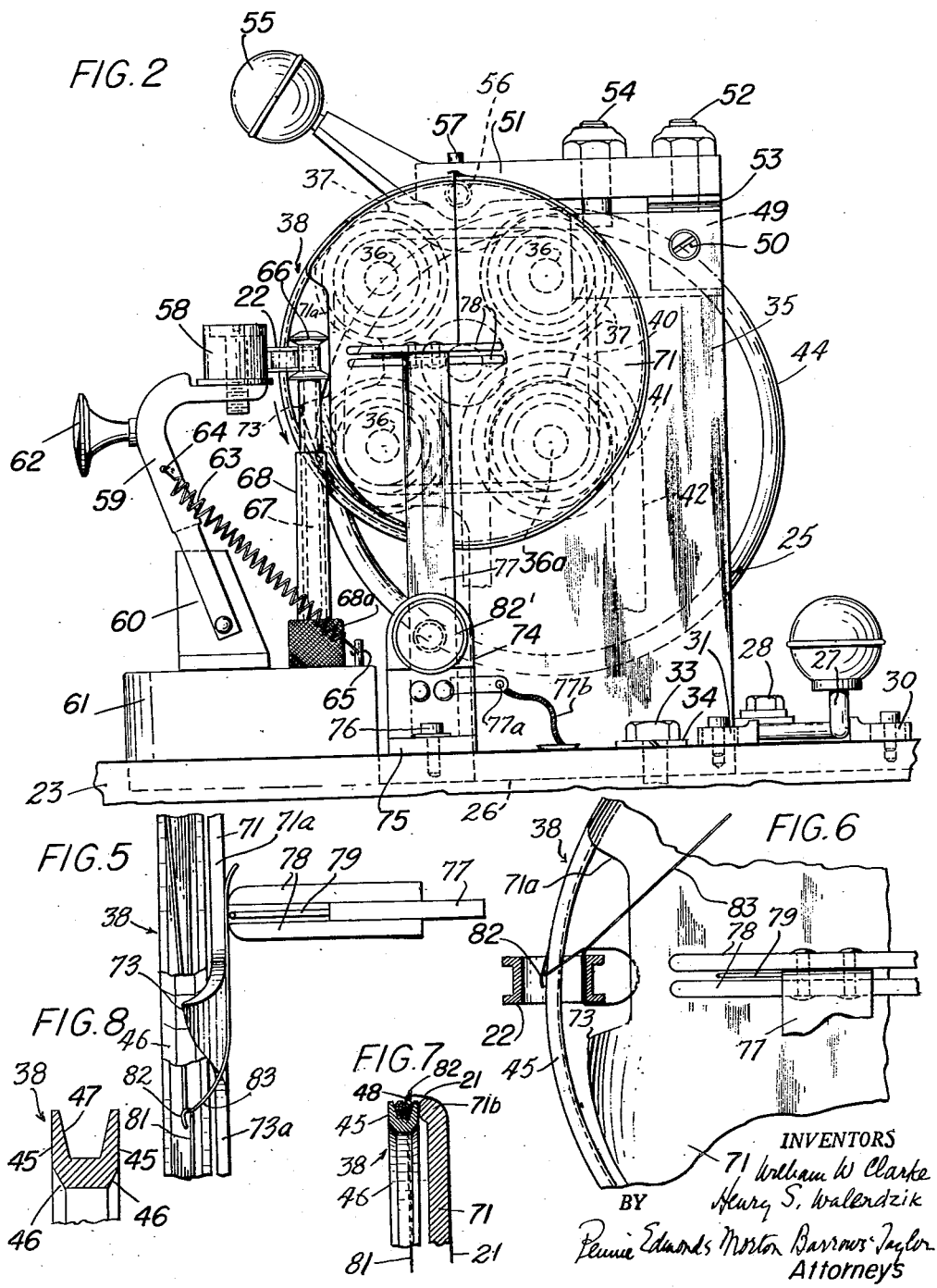

May 28, 1957  W. W. CLARKE ET AL  2,793,818
APPARATUS FOR WINDING COILS
Filed Feb. 17, 1954  3 Sheets-Sheet 3
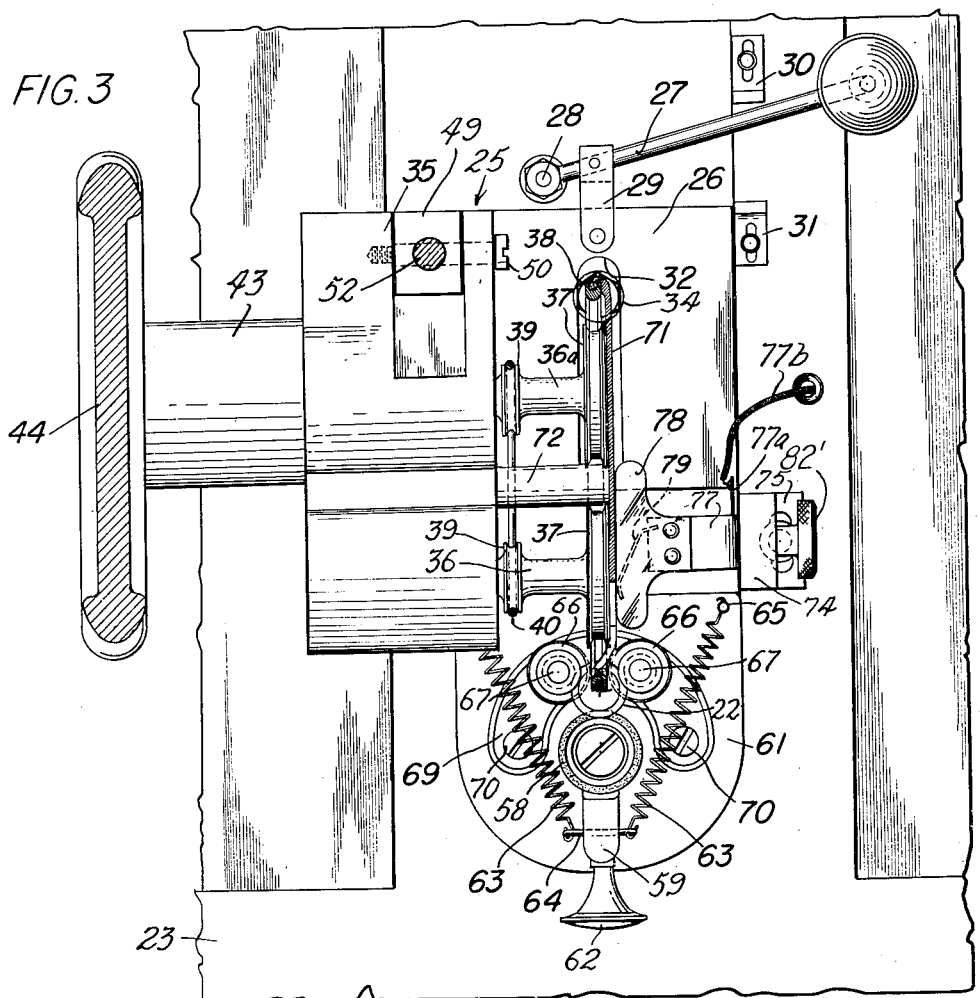
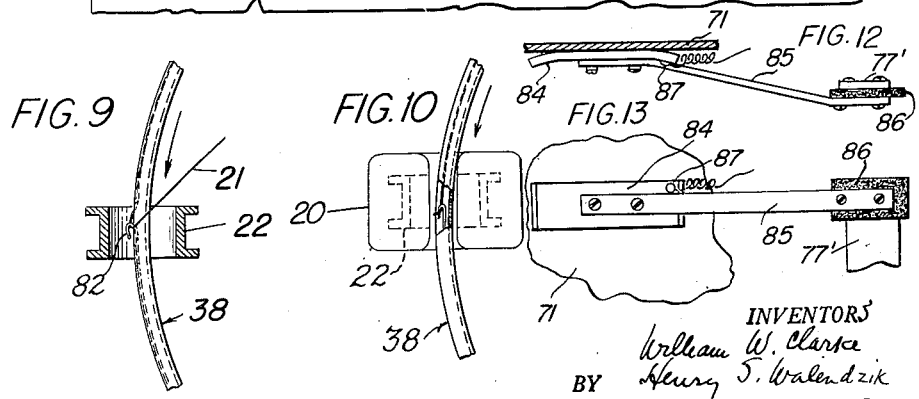
INVENTORS
William W. Clarke
Henry S. Walendzik
BY
Pennie Edmonds Morton Barrows Taylor
Attorneys

United States Patent Office 2,793,818
Patented May 28, 1957

2,793,818

APPARATUS FOR WINDING COILS

William W. Clarke, Brookfield, and Henry S. Walendzik, Danbury, Conn., assignors to Boesch Manufacturing Company, Danbury, Conn., a corporation of Connecticut Application February 17, 1954, Serial No. 410,935

7 Claims. (Cl. 242—4)

This invention relates to machines for winding a strand, such as a fine wire, helically upon a core of generally annular form to produce a toroidal coil of the type employed for loading purposes in telephone circuits. More particularly, the invention is concerned with a novel winding machine of the kind referred to, which is capable of use in the rapid production of toroidal coils, which are of smaller internal diameter than coils previously produced by machine.

Winding machines for winding fine wire helically upon annular cores are now in wide use and such machines commonly include a shuttle or winding ring, which may be interlinked with the core and has a peripheral groove, in which wire drawn from the supply is wound in an operation preliminary to the winding of the wire on the core. In the use of such a machine, the winding ring with the wire thereon is mounted to pass through the center of the core and the ring is rotated to wind the wire upon the core, while the latter is either oscillated or rotated to distribute the convolutions of the winding properly. In order that the wire being drawn from the ring may be guided and subjected to tension, a slide is mounted on the ring against the outer face of a side wall of the groove and held in place by means, such as spring arms, which embrace the ring and resist the movement of the slide along it. The slide has a channel for guiding the wire between the ring and the core and, during the portion of each rotation of the ring, the wire is pulled over the top of the side wall of the groove and through the channel in the slide. As this occurs, the pressure of the wire against the side of the channel causes the slide to move along the ring against the resistance provided by the gripping arms.

The inner diameter of toroidal coils wound on machines of the construction described must be large enough for the passage of the winding ring with the guide and tension slide in place on the outside of the ring. Also, since the wire passes directly from one end of the channel in the slide to the core, the plane of rotation of the outlet end of the channel must pass through the center of the core in order that the convolutions of the winding on the core may lie substantially in radial planes rather than in planes at an angle to radii of the core. The necessity of thus orienting the winding ring and core further raises the lower limit on the internal diameter of the coils, which can be wound on the machine. Because of these limitations, winding machines utilizing winding rings and slides or similar guiding and tensioning means on the outside of the rings cannot be employed in the production of coils of an inner diameter as small as is now desired.

The present invention is directed to the provision of a winding machine, which can be used in winding strands helically upon open center cores to form coils of an inner diameter much smaller than that of coils heretofore produced by machine. The new winding machine employs a winding ring of conventional construction, which is capable of being interlinked with the core and has a peripheral groove for the storage of a supply of the strand, but the strand is guided and controlled between the ring and the core by novel means, which do not effectively increase the largest overall dimension of a cross-section of the ring. The means for guiding and controlling the strand include a slide of novel construction, which is mounted to lie in contact with the strand wound on the core, and a stationary element disposed close to the ring and having a peripheral surface, over which the strand being drawn from the groove in the ring is led. In addition, the guiding and control means include a device, which engages and restrains the slack loop of the strand developing during a part of each rotation of the ring, and the device includes means for registering its engagement with each such slack loop and thus counting the rotations of the ring and the number of convolutions in the coil wound thereby on the core.

For a better understanding of the invention, reference may be made to the accompanying drawings, in which Fig. 1 is a view of the new winding machine in front elevation;

Fig. 2 is a view of the machine in side elevation;

Fig. 3 is a sectional view on the line 3—3 of Fig. 1;

Fig. 4 is a diagrammatic view showing the mode of use of the new guide and tension slide;

Fig. 5 is a fragmentary front elevational view of the winding ring and associated parts with the core removed;

Fig. 6 is a fragmentary side elevational view of the winding ring and associated parts with the core in place;

Fig. 7 is a fragmentary sectional view through the winding ring and guide plate showing the manner, in which the strand is drawn from the ring;

Fig. 8 is a sectional view of the winding ring on an enlarged scale;

Fig. 9 is a sectional view through the core showing the slide in relation to the winding ring at the beginning of the winding operation;

Fig. 10 is a view similar to Fig. 9 showing the relation of the slide to the winding ring near the end of the winding operation;

Fig. 11 is a view in side elevation with parts broken away showing the action of the tensioning means; and Figs. 12 and 13 are plan and elevational views, respectively, of modified features of the machine.

The winding machine of the invention is illustrated in the drawings in a form suitable for use in the production of toroidal coils indicated at 20 and made of a fine wire 21 wound helically upon a flanged core shown at 22. The machine is mounted upon a table 23 supported on suitable legs and it includes a carriage 25 having a base 26 entering a channel in the top of the table and movable along the table by means of a lever 27 pivotally attached to the table at 28 and connected to the base of the carriage by a clip 29. The lever is movable between stops 30, 31 mounted adjustably on the top of the table at one side of the path of travel of the carriage. The base of the carriage is formed with a longitudinal slot 32, and a bolt 33 extending through the slot and threaded into an opening in the top of the table forces a spring washer 34 against the top of the carriage to hold the carriage frictionally in adjusted position.

The carriage is provided with an upright housing 35 containing bearings for four shafts 36 carrying grooved rollers 37, which are encircled by a winding ring 38 seated in the groove of the rollers. The shafts are provided with pulleys 39 connected by a belt 40 and the shaft 36a of one of the rollers is provided with a pulley 41, which is connected by a belt 42 to a driving motor mounted beneath the table and not shown. Shaft 36a projects outwardly from the housing within a sleeve 43 and carries a hand wheel 44 at its end.

The winding ring 38 is of one-piece construction with a single joint, which extends across the ring and is defined by interlocking faces, and, if desired, the joint may be of the form disclosed in Quinlan Patent 2,192,694. The ring has substantially parallel outer side walls 45 and convergent inner side walls 46 adapted to engage the walls of the grooves in rollers 37. The ring is formed with a circumferential channel 47 in its outer face for receiving a supply 48 of the wire 21 to be wound on the core.

At the beginning of a winding operation, the ring must be opened to spread its ends, so that one end can be passed through the hollow center of the core, and the ring and core can be interlinked. For this purpose, a block 49 is mounted on a horizontal pivot 50 supported in walls of housing 35 adjacent the top thereof and a handle bar 51 is secured to block 49 by a bolt 52 with a spring washer 53 interposed between the bottom of the bar and the top of the block. A second bolt 54 is threaded through bar 51 and enters a socket in the top of the housing. A knob 55 is attached to the free end of the bar and the bar carries a pin 56, which enters an opening in the bar and is held in place by a screw 57, which is threaded into the bar and engages the pin. The pin projects into the interior of the winding ring and is normally out of contact therewith.

When it is desired to open the ring for removal of a completed coil or to interlink the ring with a core, the rollers 37 are rotated by the hand wheel 44 until the joint in the ring lies at approximately in the horizontal and at the forward side of the machine, that is, the side toward which the handle bar 51 extends. The bar 51 is then raised by the knob so that the bar and block 49 swing about pivot 50 as an axis. In such movement of the bar, the pin 56 within the winding ring engages the ring and distorts its upper half, so that the ring is disengaged from the forward upper roll 37. The handle is then swung about bolt 52 as an axis to cause the upper end of the ring to be laterally displaced from the lower end. The bolt 54 in the socket prevents lateral movement of bar 51, until the bar has been raised sufficiently to free the lower end of bolt 54 from its socket, and this insures that the bar 51 will not be swung laterally until the ends of the winding ring are spaced from each other.

During winding, the core 22 is held in place in part by an idler roller 58 mounted for free rotation on an arm 59 pivoted on a standard 60 attached to the top of a housing 61 secured to the top of the bed of the machine. The arm is provided with a knob 62 and a pair of springs 63 are connected at one end to a pin 64 extending through the arm and at the other to fixed pins 65 attached to the housing 61. The springs 63 act on the arm to urge the arm clockwise or counterclockwise, depending upon its position.

During the winding operation, the core 22 is held by roller 58 against a pair of grooved driven rollers 66 mounted on vertical shafts 67, which lie with sleeves 68 and extend into housing 61. Within the housing, the shafts carry pinions meshing with a gear on a drive shaft supported for fixed rotation on a vertical axis and driven by the motor of a machine. The shafts 67 and sleeves 68 extend through arcuate slots in the top of housing 61, the slots being concentric with the axis of the drive shaft. The shafts 67 and their sleeves can be moved to different positions in the slots to vary the spacing between rollers 66 as required for cores of different sizes and the shafts and sleeves may be secured at the desired positions in the slots by knurled sleeves 68a threaded on the sleeves and engageable with the top wall of housing 61. The slots can be closed by arcuate plates 69 held in place by screws 70 threaded into the top wall of the housing.

With the arrangement described, the shafts 67 and sleeves 68 are adjusted in the slots to appropriate positions for the core being wound, and the shafts and sleeves are then fixed in such positions. The adjustment of the shafts and sleeves is required, in order that the winding ring may pass through the center of the core, when the latter is held in contact with rollers 66 by the idler roller 58, and it will be apparent that the positions of rollers 66 will vary with the diameter of the core. Roller 58 is held by its springs 63 in contact with cores of all the sizes, with which the machine can function.

A guide plate 71 is mounted on the end of a post 72, which projects outwardly from housing 35 through ring 38, and the plate has a cut-out 71a for the core 22 and rollers 66. The corner 73 at the lower side of the cut-out is bent to lie with its end in or inwardly from the plane of the ring and the outer surface of the ring along its edge starting at 73 is chamfered through an arc of almost 90° to provide a guide surface over which the wire slides. At corner 73, the radius of the plate is less than that of the ring and the plate radius increases through the chamfered arc. At the end of the arc and beyond, the plate has a radius at least as great as the ring and the edge of the plate is rounded and may have a bead 71b, if desired.

A standard 74, which is preferably made of insulating material, has a foot 75, which is secured by screws 76 to the top of the table adjacent the groove, in which the base 26 of carriage 25 is mounted. A metal strip 77 is secured to the inner face of the standard and the upper end of the strip is bent to the horizontal and extends toward the face of plate 71. A pair of plates 78, which are preferably of insulating material and have long flat faces in contact with the face of plate 71, are secured to the upper and lower faces of strip 77 and extend from approximately the middle of plate 71 forwardly to about the inner edge of cut-out 71a. A spring terminal member 79 attached to the end of strip 77 lies between the upper and lower plates 78 and bears against the fixed plate 71. The terminal is connected through strip 77 to a terminal 77a, which may be connected by a conductor 77b to an electrical counting device, which is grounded through plate 71 and the frame of the machine. An adjustment screw 82' threaded into the standard 74 and bearing against strip 77 can be adjusted to vary the pressure, with which the strip forces the plates 78 against the fixed plate 71.

When the wire is being unwound from the ring and wound upon the core, the wire is drawn from the supply in the groove in the ring over the edge of the ring and it is necessary to provide guide and tension means to control the wire leaving the groove in the ring. For this purpose, the machine is equipped with a guide and tension slide 81. This slide comprises a resilient gripping section, which enters the groove in the winding ring and extends about the ring through an angle of more than 180°. The gripping section has a normal radius of curvature less than the radius of the ring, so that, when the slide is in place in the ring, the gripping section, which lies in contact with the supply of wire in the groove in the ring, grips the wire with a force depending on the material, of which the slide is made. The slide is preferably formed of resilient wire, which may be flat or round, and its length approximates the circumference of the ring, so that the gripping section of the slide is in contact with the supply of wire in the ring throughout approximately the entire circumference of the ring. The slide has a guide eye 82 for the wire to be wound and, preferably, the guide eye is formed by bending back one end of the gripping section of the slide to form a hook, which lies in the plane of the slide.

In the use of the winding machine in the winding of a toroidal coil upon a core, the empty winding ring is opened by the use of the handle bar 51 and the arm 59 is swung back to permit the core to be slipped over the lower end of the winding ring and placed against the fixed rollers 66. The arm 59 is then released, so that the idler roller 58 holds the core against rollers 66, and the bar 51 is swung back so that the ends of the winding ring are aligned, after which the bar is released to permit the ends of the ring to meet to close the joint. The wire to be wound on the core is next wound upon the winding ring and, for this purpose, the end of the wire drawn from a supply is passed in the usual way through one or more small openings formed in the wall of the ring in order to connect the wire to the ring. The motor is then started and turns the winding ring clockwise to wind the wire upon the ring in a number of convolutions, as illustrated at 48.

When the required amount of wire has been wound in the channel in the winding ring, the wire is cut between the ring and the supply and the slide is inserted in position. As the gripping section of the slide is highly resilient, it is easy to open the slide to the desired extent and slip it into place in the channel in the ring, while interlinking it with the core. The slide is placed, so that its hook extends in a counterclockwise direction on the ring and the end of the wire from supply 48 in the channel is drawn through the hook, as shown in Fig. 4. The carriage is now moved by lever 27 to center the winding ring, so that it passes through the center of the core, and the free end 83 of the wire is drawn out through the hook 82 on the slide and held at a convenient place within the winding ring. The motor is now reversed to cause the ring to rotate counterclockwise and the winding starts.

As the ring rotates, it carries the slide 81 with it through the center of the core and the wire is drawn over the side of the ring and over the edge of plate 71 and laid upon the core. As that portion of the core, on which the wire is being wound at any instant is not concentric with the winding ring, it will be apparent that throughout part of each revolution of the winding ring, the length of wire between the core and the guide eye 82 on slide 81 will be taut and the drawing off of wire will cause the slide to move clockwise relative to the ring. As soon as the guide eye passes the horizontal line through the core, there will be slackness in the wire, which has been drawn off the supply, and such slackness is indicated at 83' in the length of wire between the ends of plates 78 and the guide eye 82 of the slide. As illustrated, the wire forms a loop between the core and around plates 78 to the guide eye and, as the rotation of the ring continues, the loop is gradually shortened with the wire pulled between plates 78 and the stationary plate 71. The pressure, with which plates 78 clamp the wire against plate 71, determines the tension, with which the wire in the loop will be laid upon the core, and this pressure can be adjusted by the screw 82'. As the rotation of the ring proceeds, the loop is drawn beneath the contact member 79, forcing the member away from plate 71. As the wire is provided with an insulating coating, the passage of the wire between contact 79 and plate 71 breaks the circuit through the counting device and the latter registers the winding of a convolution upon the core.

At the beginning of the winding operation, when there is a full supply of wire in the channel in the winding ring, the hook 82 on the slide projects out of the ring, as shown in Fig. 9, but, as the winding continues and the supply of wire in the channel diminishes, the slide adjusts itself, so that the hook is drawn downward into the channel and, ultimately, when the coil is almost fully wound, the hook lies wholly within the channel. As a consequence, the use of the slide does not limit the internal diameter of the coils, which can be wound by means of a machine, since, as the internal diameter of the coils increases, the hook on the slide moves farther into the channel. With prior slides mounted on the outside of the winding ring, the internal diameter of coils, which can be wound, is limited by the overall transverse dimensions of the ring and slide, since the slide lies at all times on the outside of the ring. With the new slide, the inner diameter of cores, which can be used, is determined by the transverse dimension of the winding ring, and the presence of the slide in no way interferes with winding.

As the diameter of the winding ring may be large with reference to the core to be wound, the ring requires only a shallow groove to hold the wire necessary for a coil and the ring may be of small transverse dimensions. Accordingly, the use of the new slide permits the use of the machine in winding coils of an internal diameter substantially smaller than that of coils heretofore wound by machine.

In the machine in the form described, the circuit of the counting device utilizes the plate 71 as one terminal and the other terminal is the spring member 79, which extends generally parallel to the direction of movement of the loop 83' of wire, as the wire separates the terminals. Such a mounting of member 79 is desirable, since it need be flexed only through the diameter of the wire to break the circuit. It is not necessary, however, that the movable terminal be a part separate from the movable control plates 78; instead, the terminal and control plate may be the same part. Such a construction is shown in Figs. 12 and 13.

In the modified construction, plates 78 are replaced by a flat metallic plate or shoe 84 mounted on an arm 85 attached to a plate 86 of insulating material carried by a standard 77' similar to standard 77. Shoe 84 carries a terminal 87, by which it can be connected in the circuit of the counting device. As in the first construction, the shoe 84 extends generally parallel to the direction of movement of the loop of wire 83', as it is being taken up, so that the shoe is separated from plate 71 only by the diameter of the wire, when a loop passes between the shoe and plate.

We claim:

1. In a machine for winding a strand helically upon an annular core, the combination of a winding ring interlinkable with the core and having a peripheral groove adapted to contain a supply of the strand wound upon the ring, and a guide and tension member for the strand leaving the groove, the member including a resilient gripping section extending arcuately through more than 180° with a radius of curvature less than the radius of the ring and guide eye for the strand attached to the gripping section, the resilient gripping section and the guide eye being of such size and so mounted that as strand is unwound from the winding ring they may move into said groove.

2. In a machine for winding a strand helically upon an annular core, the combination of a winding ring interlinkable with the core and having a peripheral groove adapted to contain a supply of the strand wound upon the ring, and a guide and tension member for the strand leaving the groove, the member including a length of resilient wire extending arcuately through more than 180° with a radius of curvature less than the radius of the ring, and a guide eye for the strand attached to the length of wire, said guide and tension member and said eye being of such size and so mounted that as strand is unwound from the winding ring they move into said groove.

3. In a machine for winding a strand helically upon an annular core, the combination of a winding ring interlinkable with the core and having a peripheral groove adapted to contain a supply of the strand wound upon the ring, and a guide and tension member for the strand leaving the groove, the member being a resilient wire having an arcuate gripping section extending through 180° with a radius of curvature less than the radius of the ring, the wire extending outwardly and back upon itself at one end to form a guide eye for the strand, said guide and tension member and said eye being of such size and so mounted that as strand is unwound from the winding ring they may move into said groove.

4. In a machine for winding a strand helically upon an annular core, the combination of a winding ring interlinkable with the core and having a peripheral groove adapted to contain a supply of the strand wound upon the ring, and a guide and tension member for the strand leaving the groove, the member being a resilient wire having an arcuate gripping section extending through 180° with a radius of curvature less than the radius of the ring, one end of the wire extending outwardly and then back upon itself in the plane of the gripping section to form a guide eye for the strand, said guide and tension member and said eye being of such size and so mounted that as strand is unwound from the winding ring they may move into said groove.

5. In a machine for winding a strand helically upon an annular core, the combination of a winding ring interlinkable with the core and having a peripheral groove adapted to contain a supply of the strand wound upon the ring, means for supporting and rotating the ring, a guide and tension member having a section within the groove in the ring and of a length of more than 180° of the ring and a guide eye for the strand, and a stationary guide having a peripheral surface lying close to the periphery of the ring and engageable by the strand being drawn from the supply on the ring through the guide eye in the winding operation, the peripheral edge of the stationary guide cooperating with the peripheral edge of the winding ring to provide a surface over which a strand from said groove is bent in the winding operation which is substantially wider than the peripheral edge of the winding ring at the side of the groove.

6. In a machine for winding a strand helically upon an annular core, the combination of a winding ring interlinkable with the core and having a peripheral groove adapted to contain a supply of the strand wound upon the ring, means for supporting and rotating the ring, a guide and tension member having a section within the groove in the ring and of a length of more than 180° of the ring, and a stationary guide having a peripheral surface lying close to the periphery of the ring and engageable by the strand being drawn from the supply on the ring in the winding operation, the peripheral edge of the stationary guide cooperating with the peripheral edge of the winding ring to provide a surface over which a strand from said groove is bent in the winding operation which is substantially wider than the peripheral edge of the winding ring at the side of the groove.

7. In a machine for winding a strand upon a annular core, the combination of a winding ring interlinkable with the core and having a peripheral groove adapted to contain a supply of the strand wound upon the ring, the top of the groove being open and of a width at least as great as the width of the bottom of the groove, means for controlling the withdrawal of the strand from the groove and maintaining the strand under tension, said means including a guide and tension member engaging the supply of the strand in the groove and of an overall width less than that of the top of the groove, and a stationary guide member lying close to one lateral surface of the ring and having a peripheral surface of substantially the same radius of curvature as the peripheral surface of the ring at said side of the groove, the surfaces on the ring and member cooperating to form a substantially continuous guiding surface for the strand leaving the groove which is of substantially greater width than the peripheral edge of the winding ring at the side of the groove.

References Cited in the file of this patent

UNITED STATES PATENTS

| | | |
|---|---|---|
| 379,887 | Crannell | Mar. 20, 1888 |
| 491,262 | Jenkins | Feb. 7, 1893 |
| 583,176 | Harvey | May 25, 1897 |
| 802,359 | Nickel | Oct. 17, 1905 |
| 1,855,285 | Fusch | Apr. 26, 1932 |
| 2,171,119 | Belits | Aug. 29, 1939 |
| 2,672,297 | Harder | Mar. 16, 1954 |